(12) United States Patent
Gordon et al.

(10) Patent No.: US 8,218,825 B2
(45) Date of Patent: Jul. 10, 2012

(54) CAPTURING AND PROCESSING FACIAL MOTION DATA

(75) Inventors: Demian Gordon, Culver City, CA (US); Remington Scott, Los Angeles, CA (US); Parag Havaldar, Cerritos, CA (US); Dennis J. Hauck, Jr., Hermosa Beach, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 12/547,378

(22) Filed: Aug. 25, 2009

(65) Prior Publication Data

US 2009/0324017 A1      Dec. 31, 2009

Related U.S. Application Data

(63) Continuation of application No. 11/467,512, filed on Aug. 25, 2006, now Pat. No. 7,606,392.

(60) Provisional application No. 60/711,897, filed on Aug. 26, 2005, provisional application No. 60/711,908, filed on Aug. 26, 2005, provisional application No. 60/711,906, filed on Aug. 26, 2005, provisional application No. 60/711,907, filed on Aug. 26, 2005.

(51) Int. Cl.
*G06K 9/00* (2006.01)

(52) U.S. Cl. ......... 382/108; 382/103; 382/154; 382/285

(58) Field of Classification Search ................... 382/103, 382/108, 154, 285
See application file for complete search history.

(56) References Cited

U.S. PATENT DOCUMENTS

| 5,550,928 A | | 8/1996 | Lu et al. |
| 5,926,388 A | * | 7/1999 | Kimbrough et al. .......... 700/118 |
| 6,020,892 A | * | 2/2000 | Dillon ........................... 345/419 |
| 6,144,366 A | | 11/2000 | Numazaki et al. |

(Continued)

FOREIGN PATENT DOCUMENTS

FR      2838904 A1    10/2003

(Continued)

OTHER PUBLICATIONS

Daisaku Arita et al., "RPV-II: A Stream-Based Real-Time Parallel Vision System and Its Application to Real-Time Volume Reconstruction", Proceedings of the Second International Workshop on Computer Vision Systems, p. 174-189, Jul. 7-8, 2001, figures 1, 3, 4, 8, and pp. 175, 178, 179, 181, 184, and 185.

(Continued)

*Primary Examiner* — Wesley Tucker
(74) *Attorney, Agent, or Firm* — Samuel S. Lee; Procopio, Cory, Hargreaves & Savitch LLP

(57) ABSTRACT

Capturing and processing facial motion data includes: coupling a plurality of sensors to target points on a facial surface of an actor; capturing frame by frame images of the plurality of sensors disposed on the facial surface of the actor using at least one motion capture camera disposed on a head-mounted system; performing, in the head-mounted system, a tracking function on the frame by frame images of the plurality of sensors to accurately map the plurality of sensors for each frame; and generating, in the head-mounted system, a modeled surface representing the facial surface of the actor.

15 Claims, 4 Drawing Sheets

U.S. PATENT DOCUMENTS

| | | | | |
|---|---|---|---|---|
| 6,211,903 | B1* | 4/2001 | Bullister | 348/14.16 |
| 6,324,296 | B1* | 11/2001 | McSheery et al. | 382/107 |
| 6,653,990 | B1* | 11/2003 | Lestruhaut | 345/8 |
| 6,674,893 | B1* | 1/2004 | Abe et al. | 382/154 |
| 6,788,338 | B1 | 9/2004 | Dinev et al. | |
| 6,916,096 | B2* | 7/2005 | Eberl et al. | 351/209 |
| 7,127,081 | B1* | 10/2006 | Erdem | 382/103 |
| 7,324,110 | B2* | 1/2008 | Edwards et al. | 345/473 |
| 7,605,861 | B2* | 10/2009 | LaSalle et al. | 348/371 |
| 7,606,392 | B2* | 10/2009 | Gordon et al. | 382/103 |
| 2004/0005004 | A1 | 1/2004 | Demos | |
| 2005/0024586 | A1 | 2/2005 | Teiwes et al. | |
| 2005/0089206 | A1 | 4/2005 | Rice et al. | |
| 2006/0055699 | A1 | 3/2006 | Perlman et al. | |
| 2006/0055706 | A1* | 3/2006 | Perlman et al. | 345/589 |

FOREIGN PATENT DOCUMENTS

| | | |
|---|---|---|
| JP | 07-306956 A | 11/1995 |
| JP | 07-325936 A | 12/1995 |
| JP | 08-050660 A | 2/1996 |
| JP | 08-096162 A | 4/1996 |
| JP | 11-328440 A | 11/1999 |
| JP | 2002-005623 A | 1/2002 |
| JP | 2002-354074 A | 12/2002 |
| WO | 99/64961 A1 | 12/1999 |

OTHER PUBLICATIONS

L. Herda et al., "Using Skelton-Based Tracking to Increase the Reliability of Optical Motion Capture", Human Movement Science, 2001. http://citeseer.ist.psu.edu/herda01using.html, figures 1a and 1b, abstract, and pp. 1-3 and 19.

Eftychios Sifakis et al., "Automatic Determination of Facial Muscle Activations From Sparse Motion Capture Marker Data", ACM Transactions of Graphics (TOG), v. 24 n. 3, Jul. 2005, figure 1.

Franco, J.-S., et al., "A Distributed Approach for Real Time 3D Modeling", In Proceedings of the IEEE Workshop on Real Time 3D Sensors and Their Use. 2004.

Office Action issued in U.S. Appl. No. 11/467,506 on Sep. 18, 2008.

Office Action issued in U.S. Appl. No. 11/467,503 on Dec. 9, 2008.

Takacs et al., "The virtual human interface: a photorealistic digital human," IEEE Computer Society Publication Service Center, New York, Sep. 1, 2003, IEEE Computer Graphics and Applications 23(5):38-45.

Goulekas, "Visual Effects in a Digital World," 2001, Academic Press, San Diego, 611 pages.

Extended European Search Report issued for European Application No. 06790069.6, dated Jul. 25, 2011, 14 pages.

* cited by examiner

CAPTURING AND PROCESSING FACIAL MOTION DATA

CROSS-REFERENCE TO RELATED APPLICATIONS

The present application is a continuation application of co-pending U.S. patent application Ser. No. 11/467,512, filed Aug. 25, 2006 which claimed benefits of priority of U.S. Provisional Patent Application Ser. No. 60/711,897, filed Aug. 26, 2005, entitled "Head-mounted Digitizer System for Motion Capture of Face"; U.S. Provisional Patent Application Ser. No. 60/711,908, filed Aug. 26, 2005, entitled "Using Field Splitters in Motion Capture"; U.S. Provisional Patent Application No. 60/711,906, filed Aug. 26, 2005, entitled "Telecentric Lenses in Motion Capture"; and U.S. Provisional Patent Application Ser. No. 60/711,907, filed Aug. 26, 2005, entitled "Applying pattern to Face for Facial Digitization in Motion Capture". The disclosures of the above-referenced patent applications are incorporated herein by reference.

BACKGROUND

The present invention relates generally to a motion capture process and, more particularly, to an improved motion capture system and method that enables capturing and processing facial motion data.

Motion capture systems are used to capture the movement of a real object and map it onto a computer generated object as a way of animating it. Such systems are often used in the production of motion pictures and video games for creating a digital representation of an object or person that is used as source data to create a computer graphics (CG) animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce highly realistic animations in many popular movies.

An advantage of motion capture systems over traditional animation techniques, such as keyframing, is the capability of real-time visualization. The production team can review the spatial representation of the actor's motion in real-time or near real-time, enabling the actor to alter the physical performance in order to capture optimal data. Moreover, motion capture systems detect subtle nuances of physical movement that cannot be easily reproduced using other animation techniques, thereby yielding data that more accurately reflect natural movement. As a result, animations using source material collected using a motion capture system will exhibit a substantially more lifelike appearance.

SUMMARY

Embodiments of the present invention provide systems and methods for capturing and processing facial motion data and enabling more robust tracking of the motion of facial features of an actor to create a representation of the actor's facial motion and expression.

In one embodiment, a head-mounted system includes: at least one motion capture camera configured to capture motion data from a facial surface of an actor using a plurality of sensors disposed on the facial surface of the actor; and a motion capture processor coupled to the motion capture camera, the motion capture processor including: a storage unit; an image capture module configured to control the motion capture camera to capture frame by frame images of the plurality of sensors disposed on the facial surface of the actor, the image capture module receiving and storing the frame by frame images on the storage unit; a sensor tracking module configured to retrieve the stored frame by frame images from the storage unit, to perform a tracking function on the images to accurately map the plurality of sensors for each frame, and to provide the motion data from the facial surface; and a digital modeling module configured to receive the motion data to generate a modeled surface representing the facial surface of the actor.

In another embodiment, a method includes: coupling a plurality of sensors to target points on a facial surface of an actor; capturing frame by frame images of the plurality of sensors disposed on the facial surface of the actor using at least one motion capture camera disposed on a head-mounted system; performing, in the head-mounted system, a tracking function on the frame by frame images of the plurality of sensors to accurately map the plurality of sensors for each frame; and generating, in the head-mounted system, a modeled surface representing the facial surface of the actor.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by study of the accompanying drawings, in which like reference numerals refer to like parts, and in which.

DETAILED DESCRIPTION

As will be further described below, embodiments of the present invention satisfy the need for a motion capture system that enables more robust capturing and tracking of the surface and motion of facial features of an actor to create a representation of the actor's facial motion and expression (e.g., laughing, crying, smiling, etc.). After reading this description it will become apparent to one skilled in the art how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention as set forth in the appended claims.

A facial motion capture system, in one embodiment, is configured as a head-mounted system to track points on the surface of the face and to digitize the entire surface. The system then returns a mesh of the actor's face that is animated. Thus, in this embodiment, the head-mounted system is incorporated into a helmet or other implement that is physically attached to the actor's head or body so as to uniformly illuminate the facial markers and minimize the degree of relative movement between the camera and face. In other embodiments, facial motion capture systems are configured with a head-mounted system integrated with other motion capture cameras disposed on and/or off body.

Figure 1A:
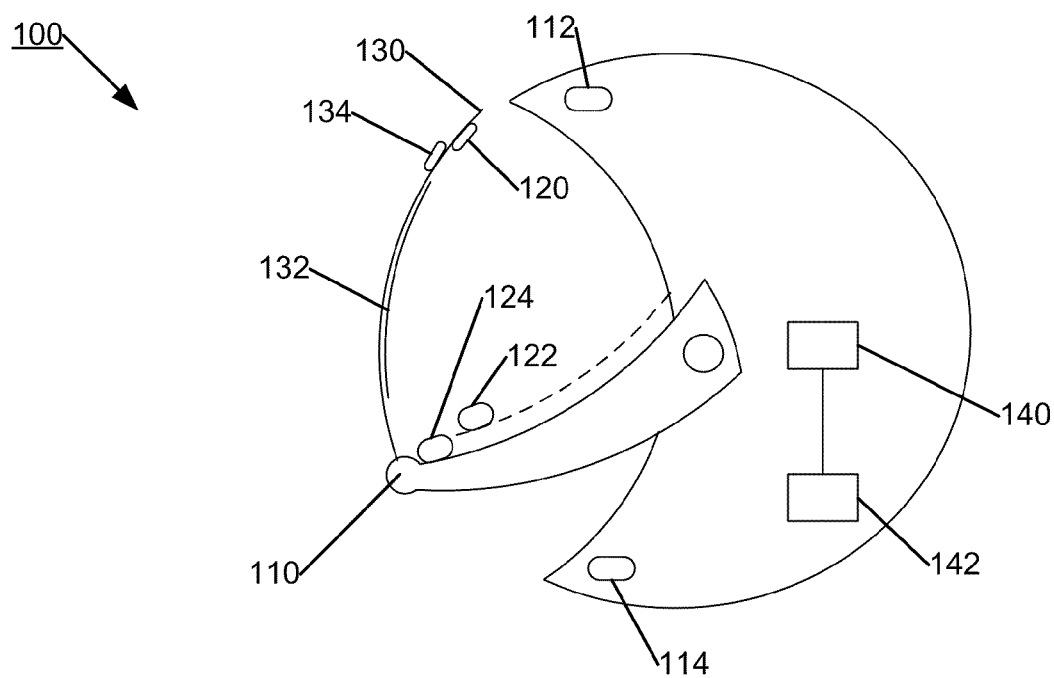
FIG. 1A is a diagram illustrating a head-mounted system according to an embodiment of the present invention.

FIG. 1A is a diagram illustrating a head-mounted system according to an embodiment of the present invention. In the illustrated embodiment, the head-mounted system is configured as a helmet 100 including a microphone 110 configured to record audio from the actor; a cooling unit such as fans 112, 114 configured to cool the actor using air or liquid, and can be turned off when the microphone is turned on; and motion capture cameras 120, 122, 124.

In one embodiment, the helmet 100 is made of carbon fiber material designed to be lightweight. The helmet 100 draws power from an on-body power source (not shown). Further, the helmet 100 records the captured data to a recorder 140 on the helmet 100 or worn by the actor. The data recorded on the recorder 140 can be downloaded wirelessly to a remote storage device. However, the data recorded on the recorder 140 can be downloaded by wire to a remote storage device. A processor 142 on the helmet 100 receives data packets (e.g., UDP) that command the recorder 140 when to start recording and when to stop recording. The processor 142 can take timecode synch and genlock information and synchronize them with other external devices used to record data or film.

In an alternative embodiment, the head-mounted system can be configured as a two part unit, wherein one part is a skull cap that attaches to the actor's head and the other part is a U-shaped piece of carbon fiber that follows along the bottom of the jaw bone and protrudes out in front of the actor's chin. Cameras can be mounted on the 'jaw bone' piece of the system. In other embodiments, the head-mounted system can be configured as a throat-mic style rig, a helmet liner style head rig, an enclosed face camera helmet, or a chest mount rig.

The motion capture cameras 120, 122, 124 inside the helmet 100 can track features of the actor's face. The cameras 120, 122, 124 can also track the surface, perform z-depth calculations using grayscale imaging, and perform 2-D to 3-D triangulation. In the illustrated embodiment, three to six different motion capture cameras are configured in the helmet 100. However, in other embodiments, any number of motion capture cameras can be configured in the helmet 100. For example, one camera can be configured to capture eye movements and three cameras can be configured to capture motions of facial features. All or some of the motion capture cameras can be configured as high resolution CMOS or CCD cameras that are small and lightweight.

In some instances, these cameras can have field splitters, which are camera lenses configured as prisms. A field splitter (such as that described in U.S. Provisional Patent Application No. 60/711,908, entitled "Using Field Splitters in Motion Capture", filed Aug. 26, 2005, the disclosure of which is incorporated herein by reference) delivers multiple fields of view in a single camera lens such that stereo vision is achievable without having multiple cameras. Further, the cameras can have telecentric lenses (such as that described in U.S. Provisional Patent Application No. 60/711,906, entitled "Telecentric Lenses in Motion Capture", filed Aug. 26, 2005, the disclosure of which is incorporated herein by reference) that remove perspective distortion, such as un-warping of the image, and improve 2D to 3D triangulation.

The cameras need to be well calibrated before the start of a performance giving the extrinsic (external camera position relative to a fixed point on the head frame work) and intrinsic parameters (internal camera parameters). Alternatively, the cameras can be self calibrated dynamically by making use of metric information either on the helmet (e.g., a striped or checkered pattern) or on the face (e.g., near the nose which tends to be more stable). Using the captured facial motion data, the entire surface of the face is digitized and a resultant mesh is output.

In one embodiment, the cameras 120, 122, 124 are controlled by a wearable computing device. In another embodiment, cameras are ergonomically mounted to cause less calibration/stabilization problems on the helmet such that each camera looks into a spherical, hyperbolic or planar mirror and captures a reflection of the facial performance. In such cases, the capture system may behave in a more stable manner during the capture process, but may need sophisticated mirror correction solutions that emulate the surface reflection from mirrors.

The reconstructed mesh is rarely consistent from frame to frame and additional pre- or post-processing may be needed to ensure this consistency. One pre-processing method may include scanning and modeling the actor's facial geometry, choosing a set of interest points and tracking only these interest points. One post-processing method may include mathematically computing a least-error fitting of the actor's facial model to the tracked feature points as they move and deform, thereby achieving the best possible consistency from frame to frame.

Figure 1B:
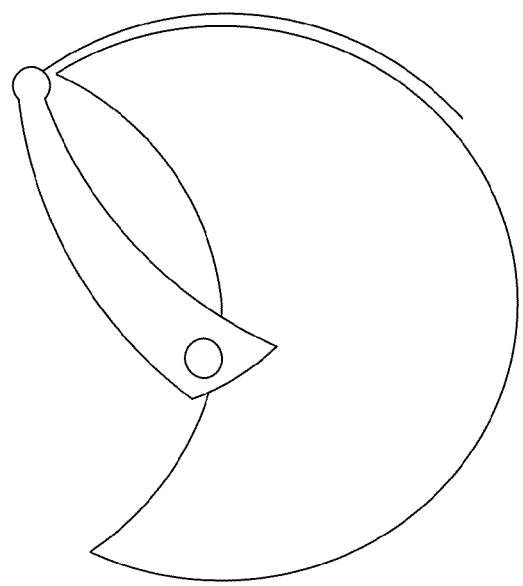
FIG. 1B is a diagram illustrating a head-mounted system with its face shield open.

In the illustrated embodiment, the helmet 100 also includes a face shield 130, which in one embodiment, is configured with tinted plastic to function as sunglasses to reduce any sunlight reflecting from the actor's face and causing tracking problems. The actor's face inside the helmet 100 can be illuminated using infrared illumination. If the motion capture process is done outside in the sunlight, the cameras 120, 122, 124 can be fitted with IR sensitive filters to take advantage of the infrared illumination. In one embodiment, the face shield 130 includes a display 132 on the inside surface to display images of environment surrounding the actor captured by a camera 134 mounted on the helmet 100. By overlaying virtual images on top of the outside image displayed on the display 132, the actor is allowed to interact with virtual world objects overlaid on top of the real-world image. This allows the actor to display natural facial expressions substantially synchronized to relevant occurrences. As shown in FIG. 1B, the face shield 130 of the helmet 100 flips up so that the actor can be comfortable between takes and is not encased in a helmet all day with very little ventilation.

In another embodiment, the helmet 100 has built-in electrooculogram (EOG) capabilities (such as that described in U.S. patent application Ser. No. 10/984,488, entitled "System and Method for Tracking Facial Muscle and Eye Motion for Computer Graphics Animation", filed Nov. 8, 2004, the disclosure of which is incorporated herein by reference) to record eye movements. In this embodiment, pairs of electrodes are placed either above and below the eye or to the left and right of the eye. If the eye is moved from the center position towards one electrode, this electrode detects the positive side of the retina and the opposite electrode detects the negative side of the retina. Consequently, a potential difference occurring between the electrodes is recorded as a measurement of the eye movement. An EOG control box can be built into the helmet 100 or can be worn on the body and plugged into the helmet to receive the signal from the electrodes and to convert that signal to motion data.

To capture facial motion data using the head-mounted system, the actor's face needs to be populated with sensors (e.g., reflective markers, spheres and/or disks) or prepared with material (e.g., paint, dye, and/or projected light) capable of providing or reflecting motion signal from the surface of the face. However, it is to be understood that the motion data includes data captured when one or more sensors have not moved. Thus, the motion data indicates the current location of a point that may or may not have moved.

Figure 2A:
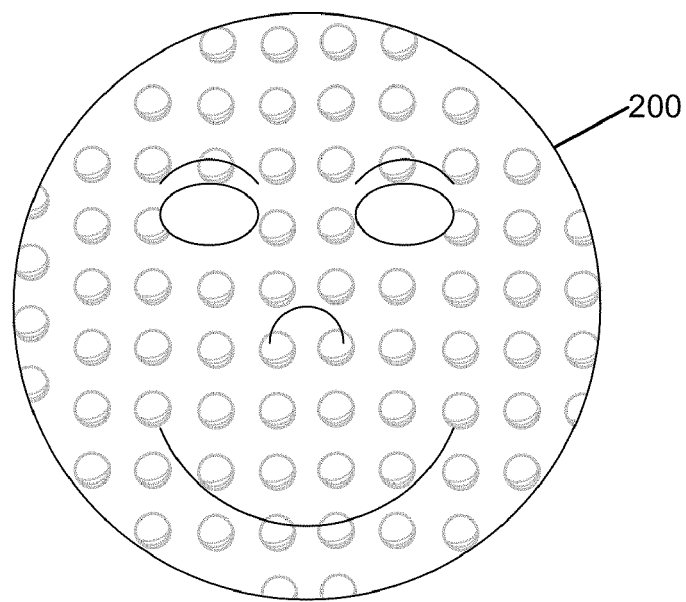
FIG. 2A shows a plurality of markers attached to a face so that the motion capture cameras can be used to capture facial expressions.
Figure 2B:
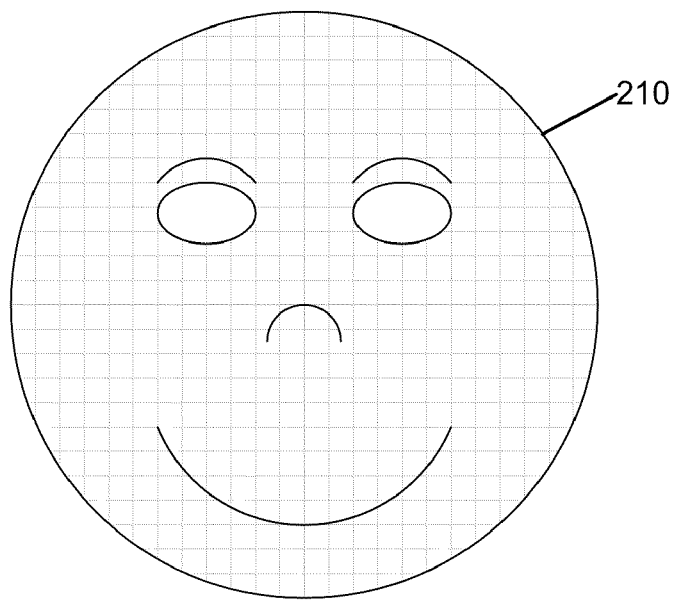
FIG. 2B shows a grid of horizontal and vertical lines or curves formed over a face so that the motion capture cameras can be used to capture facial expressions.

In one embodiment illustrated in FIG. 2A, the markers are attached to the actor's face 200 so that the motion capture cameras can be used to record the actor's expressions. Since facial movement involves relatively small muscles in comparison to the larger muscles involved in body movement, the facial markers are typically much smaller than the corresponding body markers, and the cameras typically have higher resolution than cameras usually used for body motion capture. The cameras are typically aligned in a common plane with physical movement of the actor restricted to keep the cameras focused on the actor's face. In another embodiment illustrated in FIG. 2B, a grid of horizontal and vertical lines or curves is formed over the actor's face 210. By tracking and analyzing the movement of the lines or vertices formed by grid intersections instead of discrete points, the head-mounted system is able to generate significantly more surface data than traditional marker-based tracking system.

In another embodiment, a speckle pattern is projected onto the actor's face using a small near-IR light. The motion capture cameras in the helmet sense the pattern and create a 3-D mesh of the actor's face by triangulating the speckle patterns on the skin. The entire surface of the face is then digitized and a resultant mesh is output. In another embodiment, a pattern is sprayed or applied onto the actor's face (e.g., ink or make-up). The pattern can be applied by applying paint or dye to the facial surface. The pattern can also be applied by printing or silk screening the pattern to a material that is then attached to the facial surface. Alternatively, a pattern of light or dots can be projected onto the facial surface. Again, the motion capture cameras in the helmet sense the pattern and create a 3-D mesh of the actor's face by triangulating the sprayed or applied patterns. The entire surface of the face is then digitized and a resultant mesh is output. However, in this embodiment, the final model of the actor's face solves to the consistent mesh motion. The texture that is acquired from the actor's face can be analyzed for visible light information (e.g., shadowing and when the face is lit or is in darkness). Thus, the texture can be used in the final model lighting process. In one variation, the pattern can include piezoelectric strips that measures resistance in bending of the strips with the movement of the face.

In another embodiment, an invisible strip of light is quickly passed over the actor's face back and forth using either a laser or projected line. The motion capture camera scans the strip contours as the camera passes over the face and the lines are reconstructed as surface geometry. The acquired lines are then joined to create a mesh, which is animated over time. In one variation, an eye-safe invisible laser with a rotating mirror can be built into the chin area of the helmet. In another variation, a spinning eye-safe invisible light is projected onto the face. In yet another variation, an eye-safe invisible light is projected onto a rotating mirror, which is directed at the face of the actor.

One common problem encountered by a selected motion capture setup is the temporal consistency of the reconstructed mesh from frame to frame. Lack of temporal consistency can cause problems while retargeting the reconstructed surface onto a digital face. There are various ways of ensuring a temporal mesh consistency depending on the type of motion capture method used. One way to ensure consistent temporal mesh is to use the actor's facial model involving various transitioning expressions with "interest" mesh vertices and using the mesh vertices to mathematically compute a least-error fitting of interest, which is done as a post processing after reconstruction. Another embodiment, which is done as a pre-processing to the reconstruction process, includes having a neutral face of the actor scanned, digitized and modeled prior to the reconstruction process. The model mesh vertices are then projected on the neutral face of the actor during a performance. The computation of the extrinsic parameters of the camera transformation then suggests where the neutral face model vertices lie on the video image's neutral face. These vertices can now be tracked during a performance with the aid of the above-mentioned setups (i.e., markers, paint, speckled pattern, projected lights, etc.). Finally, a 3D reconstruction is computed for only these tracked vertices yielding consistent deforming meshes from frame to frame.

Figure 3:
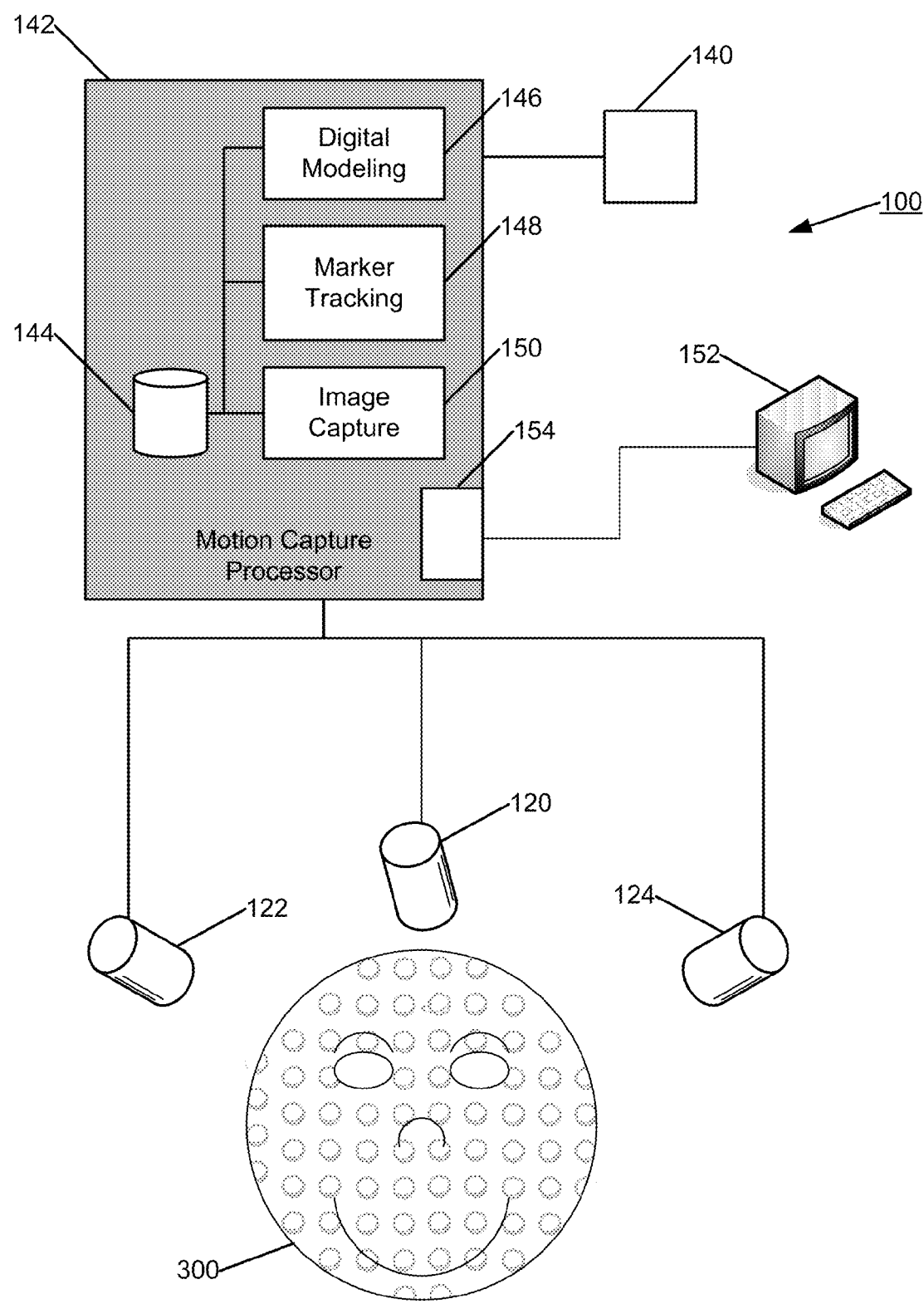
FIG. 3 is a block diagram of a motion capture processor and cameras for the helmet head-mounted system according to one embodiment.

FIG. 3 is a block diagram of the motion capture processor 142, the recorder 140, and the cameras 120, 122, 124 for the head-mounted system 100 according to one embodiment. In the illustrated embodiment, the motion capture processor 142 is connected to a recorder 140 and a user workstation 152. The motion capture processor 142 can be connected to the workstation 152 by wire or wirelessly. Thus, in one embodiment, the motion capture processor 142 includes a network interface module 154 to transmit and receive data to and from the workstation 152. As mentioned above, the processor 142 can receive data packets from the workstation 152 that command the recorder 140 when to start recording and when to stop recording.

The motion capture processor 142 includes an image capture module 150, a marker tracking module 148, a digital modeling module 146, and a storage unit 144. Connected to the motion capture processor 142 are three motion capture cameras 120, 122, 124. In one embodiment, more or less than three motion capture cameras may be used according to a variety of user and animation-related requirements. The motion capture cameras 120, 122, 124 are focused on the actor's face 300 to be captured in which target sensors (shown as spherical markers) occupy points on the surface of the face 300.

As shown in the illustrated embodiment of FIG. 3, the target points have coupled to them a plurality of markers similar to those described in connection with FIG. 2A. The cameras 120, 122, 124 may be controlled by the image capture module 150 to capture frame by frame images of the markers and pass them back to the image capture module 150 of the motion capture processor 142. In one implementation, the cameras 120, 122, 124 capture images of the markers in alternating image frames. The image frames thus captured are placed in the storage unit 144. In one embodiment, the recorder 140 can be used as a storage unit (e.g., unit 144). Alternatively, the image frames may be viewed in real-time by a user on the workstation 152.

The marker tracking module 148 retrieves the stored image frames from the storage unit 144 and performs a tracking function on the image frames to accurately map the markers of each image frame with the image frames both before and after it. In some embodiments, secondary markers that provide identities of the (primary) markers can be used as an aid for distinguishing the markers. Once this mapping is complete, the resulting data are passed to the digital modeling module 146 which creates in each frame a system of vertices in a virtual space, comprising a modeled surface representing the face 300. Because the markers captured in each frame are properly mapped to the same makers in a subsequent frame, the motion of the modeled facial surface is smooth and connected. Although the illustrated embodiment of FIG. 3 uses markers as sensors for capturing facial surface, other sensors such as painted patterns illustrated in FIG. 2B can be used.

In one embodiment, the cameras 120, 122, 124, all modules of the motion capture processor 142, and the recorder 140 are configured in a head-mounted system. In another embodiment, the cameras 120, 122, 124, the recorder 140, and the modules 144 and 150 are configured in the head-mounted system while the modules 146 and 148 are configured in the workstation 152.

Figure 4:
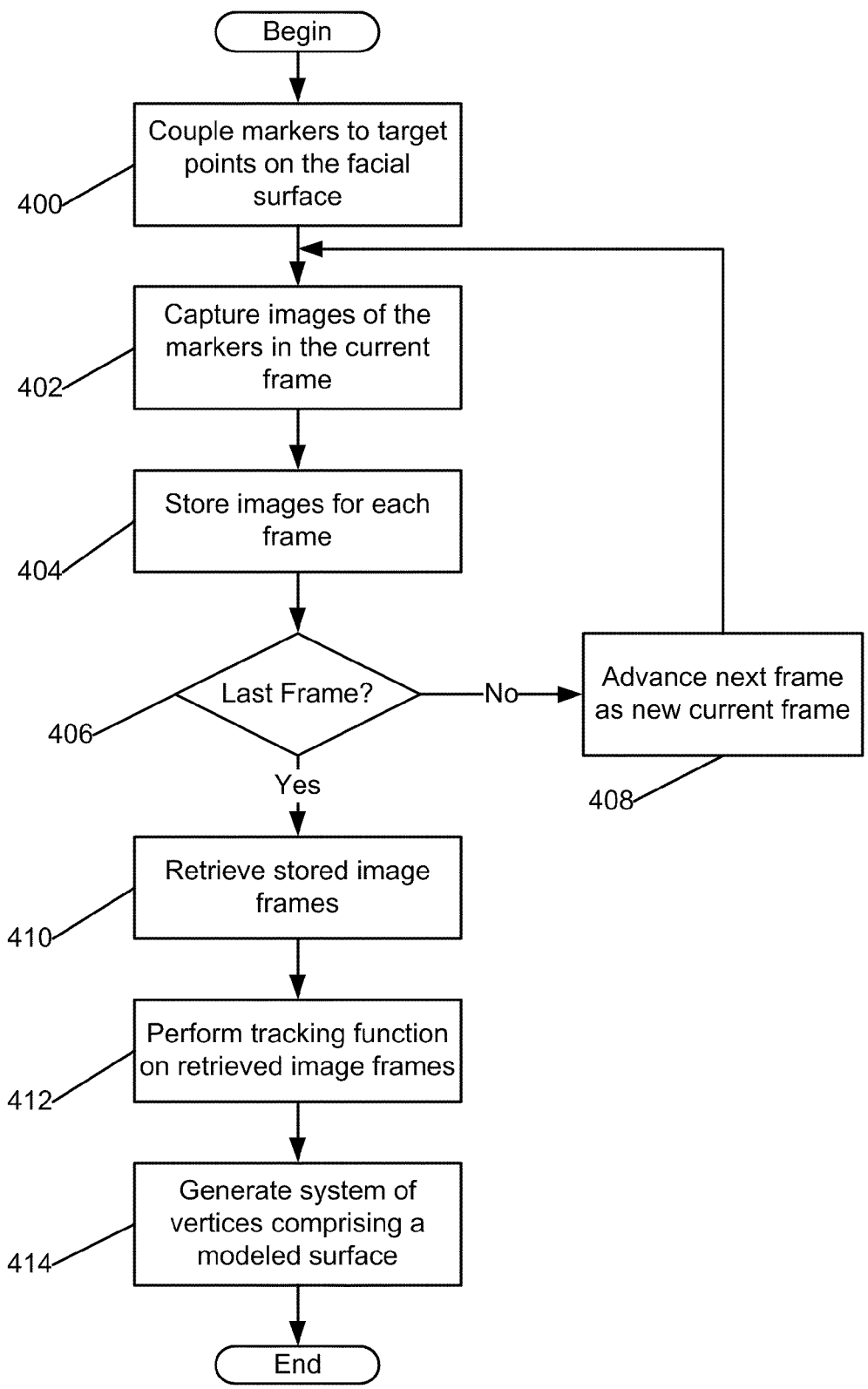
FIG. 4 is a flowchart illustrating a method according to an embodiment for capturing facial features of an actor to create a representation of the actor's facial motion and expression.

FIG. 4 is a flowchart illustrating a method according to an embodiment for capturing facial features of an actor to create a representation of the actor's facial motion and expression. The method includes coupling markers to target points on the facial surface, at 400. In one implementation, the markers are reflective spheres and the luminous reflected points on the surfaces of the spheres substantially constitute marker data points. Images of the markers in the current frame are then captured, at 402. Next, at 404, captured images are stored for each frame. If it is determined, at 406, that the current frame is not the last frame, then the next frame is advanced, at 408, and that frame becomes the new current frame. The method then continues, at 402, by using the new current frame to capture the next set of marker data points. The method proceeds as described until the current frame is determined to be the last frame. According to this implementation, marker data are thus acquired on a frame-by-frame basis.

Once the all the frames have been captured, the stored image frames are retrieved, at 410. At 412, a tracking function is performed on the retrieved image frames to accurately map the markers of each image frame with the image frames both before and after it. Once this mapping is complete, a system of vertices in a virtual space, comprising a modeled surface representing the face, is generated, at 414. The resultant modeled surface is then output as a representation of the actor's facial motion and expression.

Various illustrative embodiments of the present invention have been described. However, one of ordinary skill in the art will recognize that additional embodiments are also possible and within the scope of the present invention. For example, in one variation, a combination of sensors including markers, paint, dye, and/or projected light can be used to capture the facial features. The type of sensors would be chosen to enhance the capturing process for a particular part or feature of the face. In another variation, although the illustrations only show cameras disposed on the helmet or body, the cameras can be configured to be disposed on and/or off body to capture data from the actor's face. In another variation, although the illustrations only show motion capture of the face of a human being, the process described above can be used to motion capture moving surfaces of any object.

Accordingly, the present invention is not limited to only those embodiments described above.

What is claimed is:

1. A method of capturing and processing motion data of a facial surface of an actor, comprising:
   projecting speckle patterns on the facial surface of the actor using near-IR light to enable triangulation;
   capturing frame by frame images of the speckle pattern applied on the facial surface of the actor using at least one motion capture camera disposed on a head-mounted system by tracking and analyzing movement of the speckle pattern;
   performing, in the head-mounted system, a tracking function on said frame by frame images of said plurality of sensors to accurately map said plurality of sensors for each frame; and
   generating, in the head-mounted system, a modeled surface representing the facial surface of the actor by triangulating the speckle patterns.

2. The method of claim 1, wherein projecting speckle patterns on the facial surface of the actor comprises
   forming a grid of horizontal and vertical lines or curves over the facial surface of the actor.

3. The method of claim 2, wherein tracking and analyzing movement of the pattern comprises
   tracking and analyzing the movement of the horizontal and vertical lines or curves and vertices formed by intersections of the grid in the pattern.

4. The method of claim 1, further comprising
   performing 2-D to 3-D triangulation after said capturing frame by frame images of the pattern.

5. The method of claim 4, further comprising
   removing perspective distortion after the frame by frame images of the pattern are captured.

6. The method of claim 5, wherein said removing perspective distortion includes:
   unwarping the frame by frame images; and
   improving the 2-D to 3-D triangulation.

7. The method of claim 1, wherein tracking and analyzing movement of the pattern comprises
   tracking and analyzing the movement of lines and vertices formed by grid intersection in the pattern.

8. The method of claim 1, wherein projecting speckle patterns on the facial surface of the actor comprises
   passing an invisible strip of light over the facial surface of the actor using a laser.

9. The method of claim 8, wherein capturing frame by frame images of the pattern applied on the facial surface of the actor comprises:
   scanning strip contours of the pattern of the strip of light using said at least one motion capture camera;
   reconstructing lines created by the strip contours as surface geometry; and
   joining the lines to generate a mesh.

10. The method of claim 1, wherein projecting speckle patterns on the facial surface of the actor comprises
    applying a pattern of physical material to the facial surface of the actor.

11. The method of claim 10, wherein applying a pattern of physical material comprises
    applying or spraying a make-up, ink, paint, or dye onto the facial surface of the actor.

12. The method of claim 10, wherein applying a pattern of physical material comprises:
    printing or silk screening the pattern to the physical material; and
    attaching the physical material to the facial surface of the actor.

13. The method of claim 10, wherein applying a pattern of physical material comprises
applying piezoelectric strips on the facial surface,
wherein the piezoelectric strips measure resistance in bending of the strips with movement of the facial surface.

14. A system, comprising:
at least one motion capture camera configured to capture motion data from a facial surface of an actor using a plurality of sensors disposed on the facial surface of the actor; and
a motion capture processor coupled to said at least one motion capture camera, said motion capture processor including:
a storage unit;
an image capture module configured to control said at least one motion capture camera to capture frame by frame images of said plurality of sensors disposed on the facial surface of the actor, said image capture module receiving and storing said frame by frame images on said storage unit;
a sensor tracking module configured to retrieve the stored frame by frame images from said storage unit, to perform a tracking function on the images to accurately map said plurality of sensors for each frame, and to provide said motion data from the facial surface;
a digital modeling module configured to receive said motion data to generate a modeled surface representing the facial surface of the actor;
a microphone configured to record audio from the actor; and
a cooling unit configured to cool the actor, wherein the cooling unit is turned off when the microphone is turned on.

15. A method of capturing and processing motion data of a facial surface of an actor, comprising:
applying speckle patterns on a set of interest points of the facial surface of the actor using reflective material,
wherein the set of interest points is a set of feature points chosen by scanning and modeling facial feature of the actor;
capturing frame by frame images of the speckle patterns applied on the set of interest points of the facial surface of the actor using at least one motion capture camera disposed on a head-mounted system by tracking and analyzing movement of the speckle patterns;
performing, in the head-mounted system, a tracking function on said frame by frame images of said plurality of sensors to accurately map said plurality of sensors for each frame; and
generating, in the head-mounted system, a 3-D mesh of a modeled surface representing the set of interest points of the facial surface of the actor by triangulating the speckle patterns.

* * * * *